United States Patent
Attard

(10) Patent No.: US 9,743,641 B1
(45) Date of Patent: Aug. 29, 2017

(54) AUTOMATED GAME FEEDER

(71) Applicant: Theresa M. Attard, Weatherford, TX (US)

(72) Inventor: Theresa M. Attard, Weatherford, TX (US)

( * ) Notice: Subject to any disclaimer, the term of this patent is extended or adjusted under 35 U.S.C. 154(b) by 193 days.

(21) Appl. No.: 14/156,148

(22) Filed: Jan. 15, 2014

Related U.S. Application Data

(60) Provisional application No. 61/753,529, filed on Jan. 17, 2013.

(51) Int. Cl.
*A01K 5/02* (2006.01)

(52) U.S. Cl.
CPC .................................. *A01K 5/0291* (2013.01)

(58) Field of Classification Search
CPC ...... A01K 5/02; A01K 5/0225; A01K 5/0275; A01K 5/0291
USPC ...................... 119/51.01, 51.11, 57.91, 57.92
See application file for complete search history.

(56) References Cited

U.S. PATENT DOCUMENTS

| | | | | |
|---|---|---|---|---|
| 3,195,508 A | * | 7/1965 | Lehman et al. | 119/51.11 |
| 3,742,913 A | * | 7/1973 | Crippen | 119/51.11 |
| 5,259,337 A | * | 11/1993 | Rasmussen | 119/57.1 |
| 5,584,263 A | * | 12/1996 | Sexton | A01K 5/0114 |
| | | | | 119/51.5 |
| 5,794,563 A | * | 8/1998 | Klepac | A01K 39/014 |
| | | | | 119/51.11 |
| 6,622,653 B1 | * | 9/2003 | Starnes, Jr. | A01K 5/01 |
| | | | | 119/51.01 |
| 6,779,486 B2 | * | 8/2004 | Vaags | A01K 61/02 |
| | | | | 119/51.02 |
| 6,889,630 B1 | * | 5/2005 | Wayman | 119/57.92 |
| 7,185,606 B1 | * | 3/2007 | Racine | A01K 39/012 |
| | | | | 119/52.2 |
| 2008/0173244 A1 | * | 7/2008 | Welker et al. | 119/51.01 |
| 2009/0205573 A1 | * | 8/2009 | Briere | 119/57.91 |
| 2010/0300364 A1 | * | 12/2010 | Sena et al. | 119/51.01 |
| 2012/0097109 A1 | * | 4/2012 | Sturgeon | 119/51.01 |
| 2013/0186342 A1 | * | 7/2013 | Salinas | A01K 5/0291 |
| | | | | 119/51.11 |
| 2014/0174368 A1 | * | 6/2014 | Salinas | A01K 5/0225 |
| | | | | 119/51.11 |

OTHER PUBLICATIONS http://sell.lulusoso.com/selling-leads/1517317/TRI-POD-deer-feeder-with-electric-winch.html ("Post Date: Apr. 17, 2012").*

* cited by examiner

*Primary Examiner* — Kathleen Alker
*Assistant Examiner* — Danielle Clerkley
(74) *Attorney, Agent, or Firm* — Kenneth L Tolar

(57) ABSTRACT

A game feeder includes a housing having a plurality of support legs that elevated it above an underlying surface. Superimposed on the housing is a pivotal lid that selectively exposes a battery-powered winch mounted on the upper surface of the cap. Depending from the lower end of the housing is a feed hopper having an automated dispenser that projects feed to the surrounding area at desired times and for a desired duration. Using the winch, a hunter can easily reload the hopper by lowering it to ground level.

11 Claims, 3 Drawing Sheets

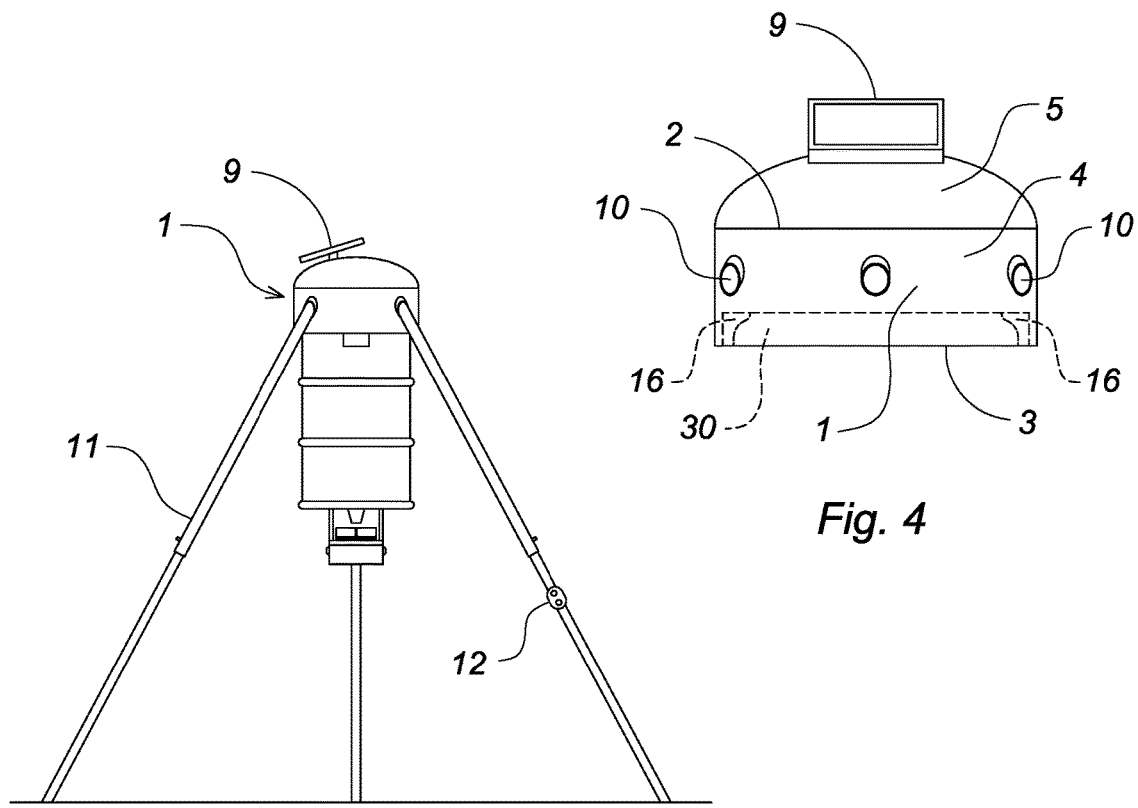
Fig. 3
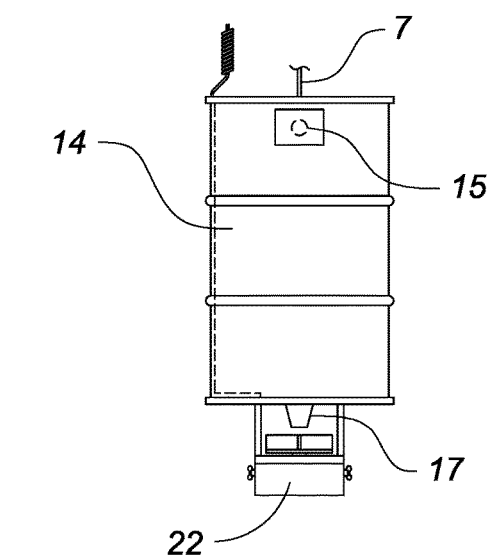
Fig. 4
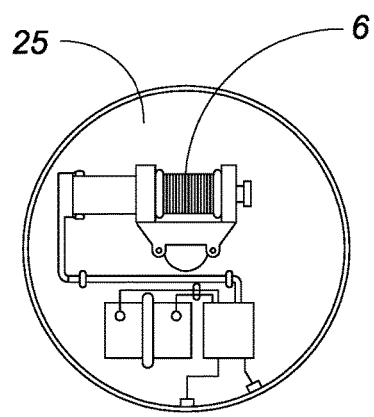
Fig. 5
Fig. 6

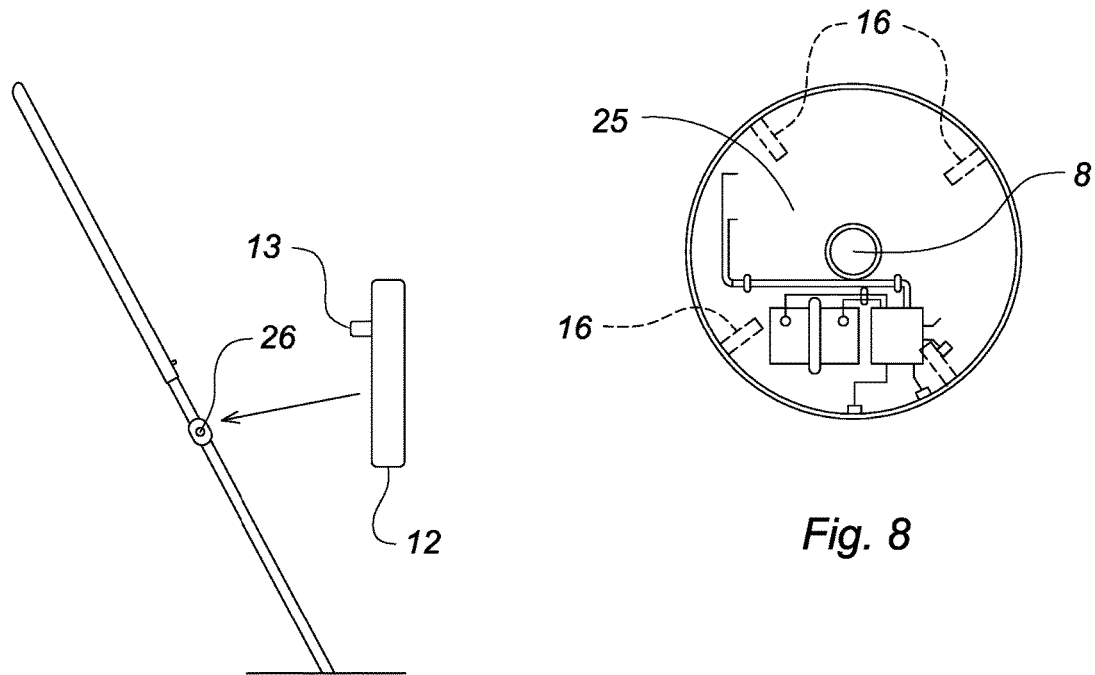
Fig. 7
Fig. 8
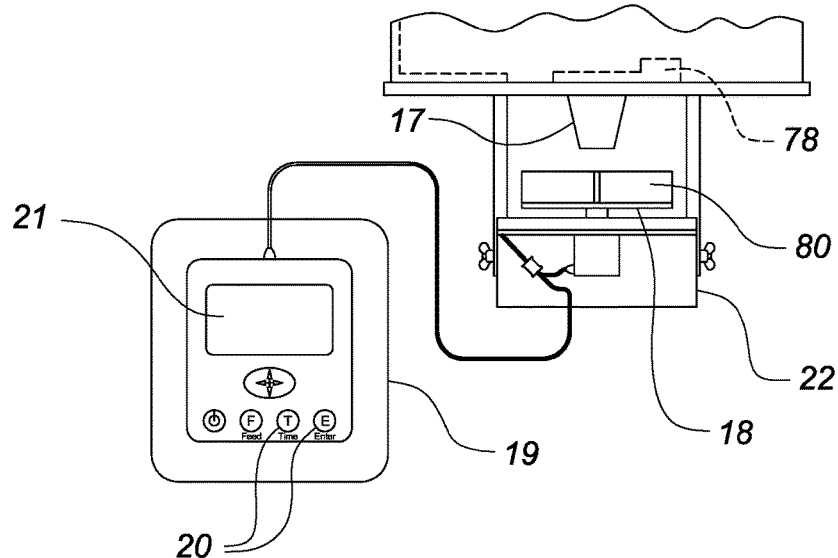
Fig. 9

AUTOMATED GAME FEEDER

CROSS REFERENCE TO RELATED APPLICATIONS

This application is entitled to the benefit of provisional patent application No. 61/753,529 filed on Jan. 17, 2013, the specification of which is incorporated herein by reference.

BACKGROUND OF THE INVENTION

The present invention relates to an automated game feeder for a hunter.

DESCRIPTION OF THE PRIOR ART

A myriad of game feeders for hunters exist in the prior art. Many include a tripod having a dispensing hopper mounted thereon. The hopper is refilled via an elevated open top that can only be accessed with a ladder or similar structure. Repeatedly ascending a ladder while carrying feed is dangerous, burdensome and inconvenient.

Accordingly, there is currently a need for a game feeder that can be loaded without ascending a ladder. The present invention addresses this need by providing a game feeder having a feed storage hopper that can be lowered to ground level.

SUMMARY OF THE INVENTION

The present invention relates to a game feeder comprising a cylindrical housing that is elevated above an underlying surface with a plurality of support legs. Superimposed on the housing is a pivotal lid that selectively exposes a battery-powered winch mounted within the housing interior. Depending from the lower end of the housing is a feed hopper having an automated dispenser that projects feed to the surrounding area at desired times and for a desired duration. Using the winch, a hunter can easily reload the hopper by lowering it to ground level.

It is therefore an object of the present invention to provide a game feeder having an elevated feed-storage hopper that can be lowered to ground level and reloaded.

It is another object of the present invention to provide a game feeder that automatically disperses feed at desired times.

It is yet another object of the present invention to provide a game feeder that eliminates the need for a ladder in order to reload a feed hopper.

Other objects, features, and advantages of the present invention will become readily apparent from the following detailed description of the preferred embodiment when considered with the attached drawings and the appended claims.

BRIEF DESCRIPTION OF THE DRAWINGS

FIG. 3 is a front, plan view of the feeder, with the feed hopper in a raised position.

FIG. 4 is an isolated view of the housing and lid.

FIG. 5 is a top view of the housing with the lid removed.

FIG. 6 is an isolated, plan view of the feed hopper.

FIG. 7 is an isolated view of support leg and the attached winch controller.

FIG. 8 is a top view of the housing with the winch removed.

FIG. 9 is an isolated view of the spinner and associated controller.

DESCRIPTION OF THE PREFERRED EMBODIMENT

Figure 1:
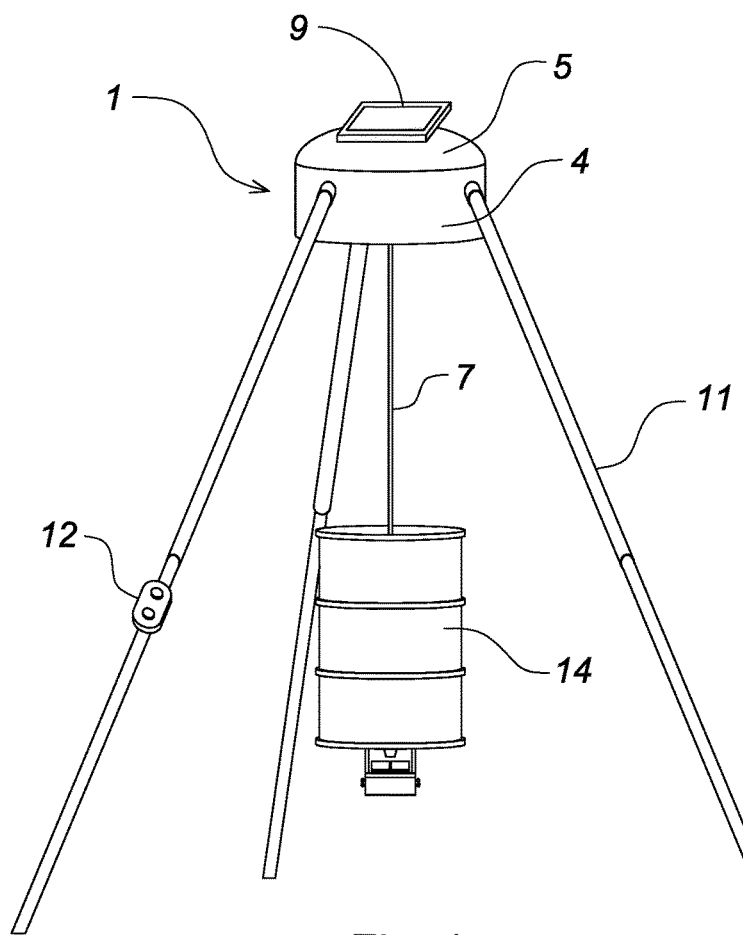
FIG. 1 is a perspective view of the automated game feeder according to the present invention, with the feed hopper in a lowered position.
Figure 2:
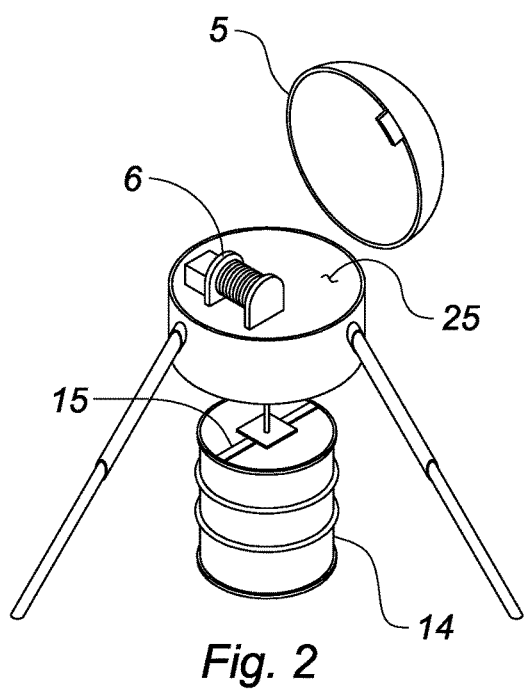
FIG. 2 is a top, slightly-exploded view of the feeder depicted in FIG. 1.

The present invention relates to a game feeder comprising a cylindrical housing 1 having an open upper end 2, a peripheral lower edge 3 and a continuous outer wall 4. Superimposed on the housing is a pivotal lid 5 that selectively exposes a motorized winch 6 mounted on a horizontal support plate 25. The winch extends and retracts a cable 7 through an aperture 8 on the support plate 25. The winch motor is powered by an internal battery that is continuously recharged by an angularly-adjustable solar panel 9 mounted on the lid. The winch includes a brake that prevents the cable from inadvertently unwinding when a load is applied thereto.

Peripherally positioned on the housing outer wall are a plurality of sockets 10 for removably receiving telescopic support legs 11 that elevate the housing above an underlying surface. Removably mounted on one of the support legs is a controller 12 that allows a user to adjust the retraction and extension speed of the winch. The controller includes a post 13 that removably seats within a cavity 26 formed in one of the support legs, allowing the controller to be removed for storage.

Below the housing is a cylindrical feed hopper 14 having a closed lower end, an outer wall and an open upper end in communication with an interior storage chamber. A distal end of the winch cable is attached to a crossbar 15 within the feed-hopper interior. An indention 30 at the lower edge of the housing includes one or more guides 16 that receive the upper rim of the hopper to fix the hopper in a raised position. Therefore, the winch includes a safety switch and corresponding stop member that prevent further lifting when the hopper is properly seated within the indention.

Depending from the lower end of the hopper is a dispensing spout 17 that is aligned with an opening and a release plate 78. Upon receipt of a select command, a solenoid retracts the release plate to allow feed within the interior chamber to flow through the opening and spout and onto an underlying, motorized spinner 18. The spinner includes multiple, radially-extending blades 80 that project the feed to a surrounding area.

The spinner motor and release plate are operated with an associated controller 19 that allows a user to preset feed-dispersal frequency, duration and time-of-day, as desired. The controller includes a housing having buttons 20 that depict a menu on a display 21 for selecting the pertinent feed options. At the selected feed time, the controller activates the spinner motor and retracts the release plate for the selected duration. Upon expiration of the selected duration, the controller extends the release plate and disables the motor until the next feed sequence. The controller and spinner motor are protected within an enclosure 22 that is surrounded by bumpers on the lower surface of the hopper that minimize impact damage.

Accordingly, to load the hopper, a user activates the winch to lower the hopper to an accessible level. The user then programs the controller to activate the spinner at desired times and for a desired duration. When programming has been completed, the user raises the hopper to seat within the cap indention. At the selected times, feed is automatically dispersed to the surrounding area for the desired duration.

The above-described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A game feeder comprising:
    an elevated housing;
    a feed hopper positioned beneath said housing;
    a motorized winch for moving said feed hopper between a lowered position, proximal ground level, and a raised, operating position immediately beneath said housing to assist a user with loading said feed hopper;
    a release plate at a lower end of said feed hopper, said release plate overlaying a dispensing opening;
    a dispensing spout depending from the lower end of said feed hopper and aligned with the dispensing opening;
    a motorized spinner positioned beneath said dispensing spout;
    a controller for automatically retracting said release plate to allow feed within the interior of said hopper to flow through the spout and onto said motorized spinner;
    wherein said winch is mounted within said housing, further said winch retracting and extending a cable attached to said hopper; and
    wherein said housing has an indention at a lower end with at least one guide positioned therein for receiving an upper rim of the feed hopper to fix the feed hopper in the raised position.

2. The game feeder according to claim 1 further comprising a lid mounted on said housing, said lid having a solar panel thereon for recharging a battery that powers said winch motor.

3. The game feeder according to claim 1 further comprising a control means for adjusting a retraction and extension speed of said winch.

4. The game feeder according to claim 1 wherein said controller for automatically retracting said release plate is programmable and adapted for presetting feed-dispersal frequency, duration and time-of-day.

5. The game feeder according to claim 4 wherein said housing is mounted on telescoping support legs that elevate said housing above underlying terrain.

6. The game feeder according to claim 1 wherein the winch includes a safety switch and corresponding stop member that prevent further lifting when the hopper is properly seated within the indention.

7. The game feeder according to claim 5 wherein said controller for automatically retracting said release plate further comprises:
    a programmable controller with command buttons thereon; and
    a display screen that depicts an interactive menu for selecting feed-dispersal frequency, duration and time-of-day with said control buttons.

8. The game feeder according to claim 3 wherein said housing is mounted on telescoping support legs that elevate said housing above underlying terrain; and wherein said control means includes a post that removably seats within a cavity formed in one of the support legs, allowing said control means to be removed for storage.

9. The game feeder according to claim 1 wherein said spinner includes multiple, radially extending blades that project the feed to a surrounding area.

10. The game feeder according to claim 2 wherein said lid is pivotal to selectively expose said winch.

11. The game feeder according to claim 2 wherein said winch includes a brake that prevents the cable from inadvertently unwinding when a load is applied thereto.

* * * * *